No. 807,611. PATENTED DEC. 19, 1905.
E. FAIRBURN.
NON-SKIDDING COVER FOR TIRES.
APPLICATION FILED JULY 24, 1905.

2 SHEETS—SHEET 1.

WITNESSES
Abm Reed
Wilfred Alderson

INVENTOR
Edward Fairburn
By John B Walsh
Attorney

No. 807,611. PATENTED DEC. 19, 1905.
E. FAIRBURN.
NON-SKIDDING COVER FOR TIRES.
APPLICATION FILED JULY 24, 1905.

2 SHEETS—SHEET 2.

WITNESSES
A. Reed
Wilfred Alderson

INVENTOR
Edward Fairburn
By John B. Walsh
Attorney

UNITED STATES PATENT OFFICE.

EDWARD FAIRBURN, OF BRIGHOUSE, ENGLAND.

NON-SKIDDING COVER FOR TIRES.

No. 807,611.        Specification of Letters Patent.        Patented Dec. 19, 1905.

Application filed July 24, 1905. Serial No. 271,086.

*To all whom it may concern:*

Be it known that I, EDWARD FAIRBURN, belting manufacturer, a subject of the King of Great Britain, residing at Brighouse, in the county of York, England, (whose postal address is Calder Vale Mills, Brighouse, in the aforesaid county of York,) have invented certain new and useful Improvements Entitled "An Improved Non-Skidding Cover for the Wheel-Tires of Motor-Cars, Motor-Cycles, and the Like," of which the following is a specification.

The object of this invention is to provide a non-skidding cover for the wheel-tires of motor-cars, motor-cycles, and the like, cheap, durable, easily attached or detached, which will prevent side slip and serve as a protection against puncture.

This invention consists of a number of strips of leather and links of metal suitably arranged and held together about the tread of the wheel-tire by pins or the like and rigidly secured to said tire or rim in any suitable or desirable manner.

Similar letters refer to similar parts throughout the several views.

Figure 1:
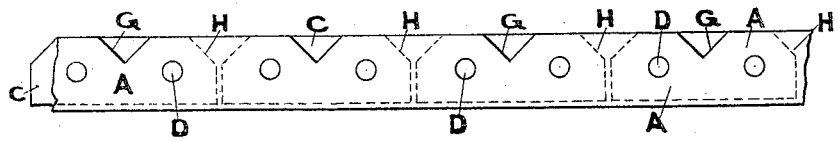
Figure 2:
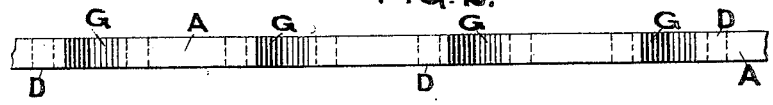
Figure 3:
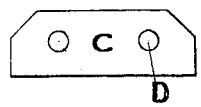
Figure 4:
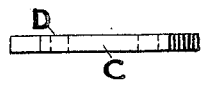
Figure 5:
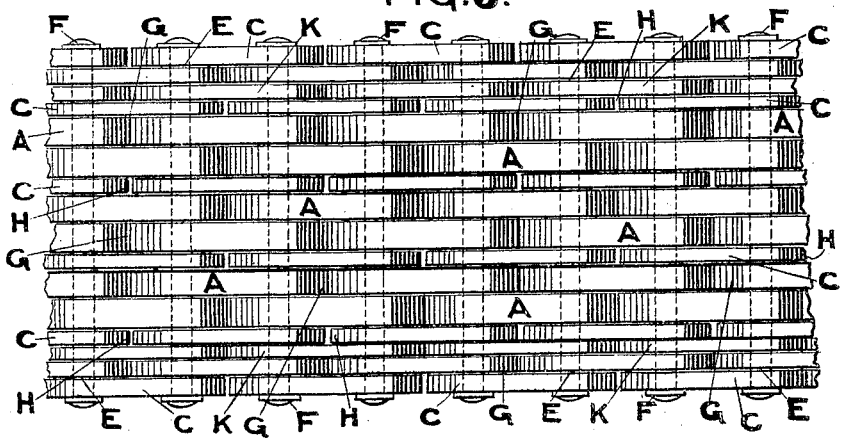
Figure 6:
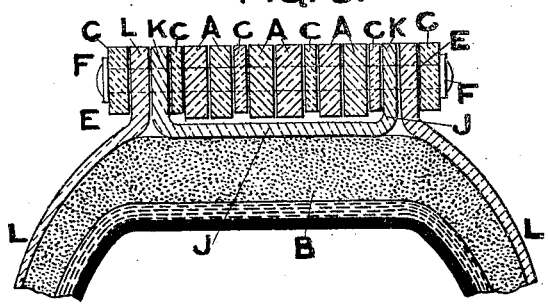
Figure 7:
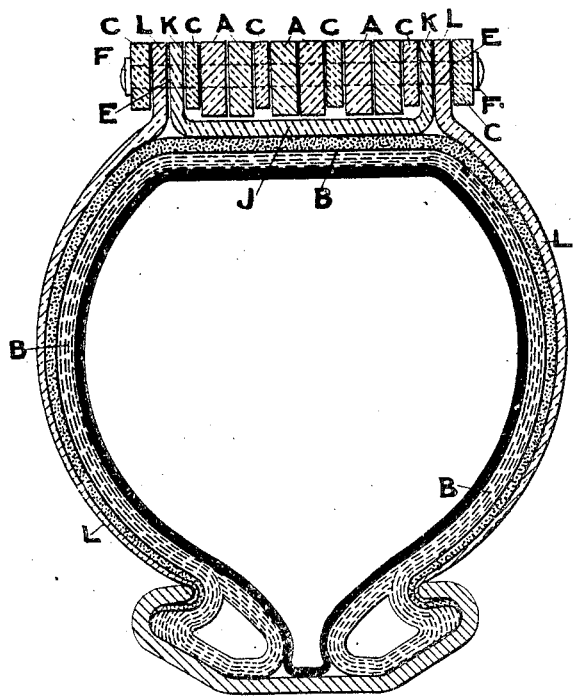
Figure 8:
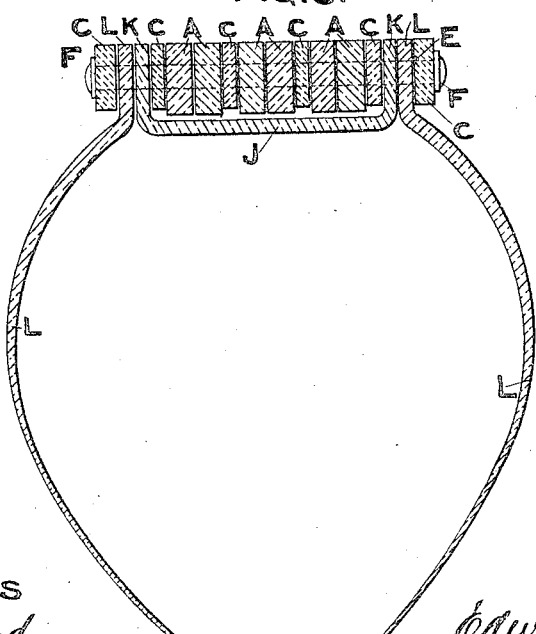

Figure 1 is a side elevation of a section of my improved cover without the attaching means. Fig. 2 is a plan view of a section of leather strip employed in the construction of my non-skidding cover for wheel-tires. Figs. 3 and 4 are elevation and plan of metal links employed in the construction of said cover. Fig. 5 is a plan of the "tread" of my improved non-skidding cover, showing the arrangement of the leather strips and metal links forming same. Fig. 6 is a sectional elevation of part of an ordinary motor-car wheel-tire with my improved cover applied. Fig. 7 is a sectional elevation showing my improved non-skidding cover applied to a well-worn tire or a tire without the thickened rubber tread. Fig. 8 shows a transverse section of my improved non-skidding cover for wheel-tires of motor-cars, motor-cycles, and the like detached.

I construct my improved cover preferably of a number of strips or pieces of leather A of a suitable size and section or shape. The strips extend or are of a length equal to the circumference of the wheel-tire B and are employed in conjunction with a number of metal links C, preferably of steel. These strips of leather A and links of metal C are provided with suitable holes D and when arranged in position are secured together and made endless by passing through the said holes suitable transverse pins or studs E, with washers and rivet-heads F formed at each end to permanently hold them in position. The leather strips A have notches G a suitable distance apart, preferably equal to the length of the metal links, whose beveled upper corners (when the links are in position) form further notches or recesses H. The notches or recesses formed by the ends of the metal links and in the leather strips are placed opposite the straight part or body of the adjacent strips or links, so that the lines of notches or recesses run obliquely across the face or tread of the aforesaid cover. The metal links are slightly less in depth than the leather strips on account of the greater liability to compression of the latter.

In order to prevent foreign or injurious materials from working through the interstices of the links and strips and puncturing or otherwise injuring the tire B, I employ (see Figs. 6, 7, and 8) a leather or the like covering or shield J, with turned-up edges or sides K, corresponding with and secured in like manner to the strips A aforesaid. This covering or shield J buffers between the tread of the ordinary tire and the bottom of the non-skidding cover and serves as a receptacle for receiving the grit or other injurious matter which may have filtered or worked through and prevents the same from coming in contact with the tire. The attaching flaps or wings L for securing the cover to the wheel-tire B are also mounted or secured to the cover by the pins E, and their upper edges, as well as the upper edges of the turned-up sides K of the buffer-shield J, are notched and serve the same purpose as the leather strips A aforesaid. The covering or shield J and flaps L are preferably of less thickness than the leather strips A, the flaps in particular tapering in thickness to their outer extremity and may be cemented onto the ordinary tire and the two secured to the rim by inflation in the usual manner.

Any number of leather or the like strips A and metal links C may be used according to the size of the wheel-tire, and in place of the leather strips leather links may be employed, or a combination of the two, and the arrangement and proportion of leather or the like, strips or links, and metal links may be varied as found necessary or desirable.

The notches and recesses in the tread of the cover add greatly to the gripping and non-skidding properties of same, while the hard metal links in conducing to this effect serve to stiffen the structure and improve its stability and durability.

Should the cover stretch with use, it may be easily and quickly shortened to the desired length by the removal of one of the pins E, shortening of the strips and the taking out of a row of links, the replacing of the pin completing the operation.

For motor-cycles a lighter type of cover may be employed mounted and secured as before described, or instead of securing the cover to the tire as before described straps and buckles attached to each side of cover may be employed, if desired, or any other means of attachment may be employed, and any suitable metal material or substance employed in the manufacture of the aforesaid cover.

This invention is especially serviceable on application to worn-out tires, as apart from the advantages derived from the use of the said cover it saves the cost of rubbering or renewing of the outer cover or envelop. Further, in using this non-skidding cover a great saving in rubber is effected, as the thickened rubber tread common to wheel-tires may be dispensed with and the outer cover made of one uniform thickness. (See Fig. 7.)

What I claim as my invention, and desire to secure by Letters Patent, is—

1. In a tire-armor, the combination, with a channel-shaped ring of leather, of a series of leather rings, a series of rings formed of metallic links, both series of rings being arranged in the said channel-shaped ring, and pins pivoting the said links together and passing through the said leather rings and the flanges of the said channel-shaped ring.

2. In a tire-armor, the combination, with a series of leather rings arranged in pairs, of rings formed of metallic links and arranged between each pair of the leather rings, and pins pivoting the said links together and passing through the said leather rings.

3. In a tire-armor, the combination, with a series of leather rings provided with notches in their peripheries, of rings formed of metallic links and arranged between the said leather rings with the spaces between the links in line with each other and out of line with the said notches, and pins pivoting the said links together and passing through the said leather rings.

In testimony whereof I hereunto affix my signature in the presence of two witnesses.

EDW. FAIRBURN.

Witnesses:
   AFUS REED,
   WILFRED ALDERSON.